(12) United States Patent
Lee

(10) Patent No.: US 7,319,338 B2
(45) Date of Patent: Jan. 15, 2008

(54) CHIP TESTER FOR TESTING VALIDITY OF A CHIPSET

(75) Inventor: Douglas Lee, Hsin Tien (TW)

(73) Assignee: VIA Technologies Inc., Taipei (TW)

( * ) Notice: Subject to any disclaimer, the term of this patent is extended or adjusted under 35 U.S.C. 154(b) by 325 days.

(21) Appl. No.: 11/124,228

(22) Filed: May 9, 2005

(65) Prior Publication Data

US 2006/0053346 A1    Mar. 9, 2006

(30) Foreign Application Priority Data

Sep. 7, 2004    (TW) .............................. 93127019 A

(51) Int. Cl.
*G01R 31/02* (2006.01)
(52) U.S. Cl. ...................................... 324/755; 324/765
(58) Field of Classification Search ............ None
See application file for complete search history.

(56) References Cited

U.S. PATENT DOCUMENTS

| | | | |
|---|---|---|---|
| 5,801,441 A * | 9/1998 | DiStefano et al. | 257/696 |
| 6,441,630 B1 * | 8/2002 | Obikane et al. | 324/758 |
| 2002/0137369 A1 * | 9/2002 | Edwards et al. | 439/77 |
| 2003/0134526 A1 | 7/2003 | Cheng et al. | |

* cited by examiner

*Primary Examiner*—Minh N. Tang
(74) *Attorney, Agent, or Firm*—Birch, Stewart, Kolasch & Birch, LLP

(57) ABSTRACT

A chip tester is mounted on a circuit board for testing validity of a chipset includes a base member that receives the chipset thereon and that has a plurality of testing contacts in electrical communication with the circuit board and, and a top cover that is mounted on the base member to confine the chipset therebetween and has a test opening for access to the chip set. When the chipset is confined between the top cover and the base member, electrical contacts of the chipset are in contact with the testing contacts in the base member.

20 Claims, 4 Drawing Sheets

CHIP TESTER FOR TESTING VALIDITY OF A CHIPSET

BACKGROUND OF THE INVENTION

1. Field of the Invention

The invention relates to a tester, more particularly to a chip tester for testing validity of a chipset and an uncapped chipset.

2. Brief Discussion of the Related Art

A plurality of integrated circuit paths having designated ability are generally formed on a wafer which is manufactured by using complicated semiconductor constructing technology and which is latter cut into a plurality of dies to form a plurality of chipsets. Therefore, when we say a chipset, it is generally enclosed within an enclosure with only the contact ends exposed to an exterior of the enclosure. Prior to employment of an electronic device, such as a motherboard and the like, a chipset must undergo a testing operation in order to ensure proper function of the same.

Referring to FIG. 1, a conventional chip tester 20 is shown to include a base member 22 defining a chip-receiving space 221 for receiving a chipset 10 therein, and a top cover 24 mounted pivotally above the base member 22 via a fastening mechanism for confining the chipset 10 between the base member 22 and the top cover 24. The base member 22 is formed with a plurality of testing contacts 223. The chipset 10 generally includes a base plate 14, a die 12, an enclosure 16, and a plurality of tin (Sn) contacts 18. The base plate 14 is made from a dielectric material, and has an upper conductive layer 142, a lower conductive layer 146, and a plurality of conductor stems 148 interconnecting electrically the upper and lower conductive layers 142 and 146. The tin (Sn) contacts 18 are formed on the lower conductive layer 146. The die 12 is disposed on base plate 14 in such a manner to be in electrical communication with the upper conductive layer 142. The enclosure 16 encloses the assembly of the base plate 14, the die 12, and the upper and lower conductive layers 142, 146 except the tin contacts 18 via which the integrated circuits of the die 12 can establish electrical communication with circuit paths of a peripheral device, such as bus system of the motherboard. Once the chipset 10 is disposed in the conventional chip tester 20, the tin (Sn) contacts 18 are in touch with the testing contacts 223 of the base member 22 of the conventional chip tester 20. Under this condition, a testing operation can be conducted to find out validity of the chipset 10.

One drawback of the aforesaid conventional chip tester 20 resides in that the testing operation is conducted only after closing of the top cover 24 on the base member 22. However, in case the chipset 10 is invalid, the former is generally uncapped in order to expose the die 12 as well as the hidden circuit paths so that the testing person can use, alternate testing method, such as by using detection needles to locate the damaged circuit path. Since the top cover 24 of the conventional chip tester 20 is not provided with access means, testing operation of the uncapped chipset with the detection needles cannot be conducted.

Presently, two methods are used to test the uncapped chipset. Firstly, the uncapped chipset is directly soldered onto the circuit board 28 to test the validity of the integrated circuit paths therein. Such type of testing may cause damage to the integrated circuit paths of the uncapped chipset, thereby providing an indefinite result. In addition, frequent soldering of the uncapped chipset on the circuit board 28 can ruin the circuit board 28 untimely. Secondly, another conventional chip tester is used which includes only a base member defining a chip-receiving recess which is confined by a recess-defining wall with a relative depth so as to ensure retention of uncapped chipset therein. When the uncapped chipset is thus disposed, the detection needles cannot reach the peripheral edge of the uncapped chipset for testing the exposed integrated circuit paths due to hindrance of the recess-defining wall. Moreover, the exposed integrated circuit paths of the uncapped chipset may damage due to accidental collision against the base member during insertion and removal of the uncapped chipset from the chip-receiving recess in the base member.

SUMMARY OF THE INVENTION

The invention provides a chip tester having a top cover unit that can eliminate the aforesaid drawbacks resulting from the use of the conventional chip tester.

A chip tester of the present invention is mounted on a circuit board for testing validity of a chipset. The chipset includes a base plate, a die disposed on an upper surface of the base plate, a plurality of electrical contacts disposed on a lower surface of the base plate, and an enclosure enclosing the base plate and the die in such a manner that the electrical contacts protrude outwardly from the enclosure. The chip tester according to the present invention includes: a base member for receiving the chipset thereon and having a plurality of built-in testing contacts that are adapted to be in electrical communication with the circuit board and the electrical contacts of the chipset; and a top cover mounted on the base member and having a test opening for access to the chip set.

A top cover unit of the present invention is used in a chip tester which is mounted on a circuit board for testing validity of a chipset and which includes a base member for receiving the chipset thereon. The chipset includes a base plate, a die disposed on an upper surface of the base plate, a plurality of electrical contacts disposed on a lower surface of the base plate, and an enclosure enclosing the base plate and the die in such a manner that the electrical contacts protrude outwardly from the enclosure. The top cover unit is disposed on the base member in order to permit extension of a testing needle for directly testing validity of the chipset, and includes: a main body having a test opening for exposing the die of the chipset to an exterior thereof once the chipset is uncapped; and a coupling member coupling the main body to the base member so as to confine the chipset between the main body and the base member.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following detailed description and the accompanying drawings, which are given by way of illustration only, and thus are not limitative of the present application, and in which.

DETAILED DESCRIPTION OF THE PREFERRED EMBODIMENTS

Figure 1:
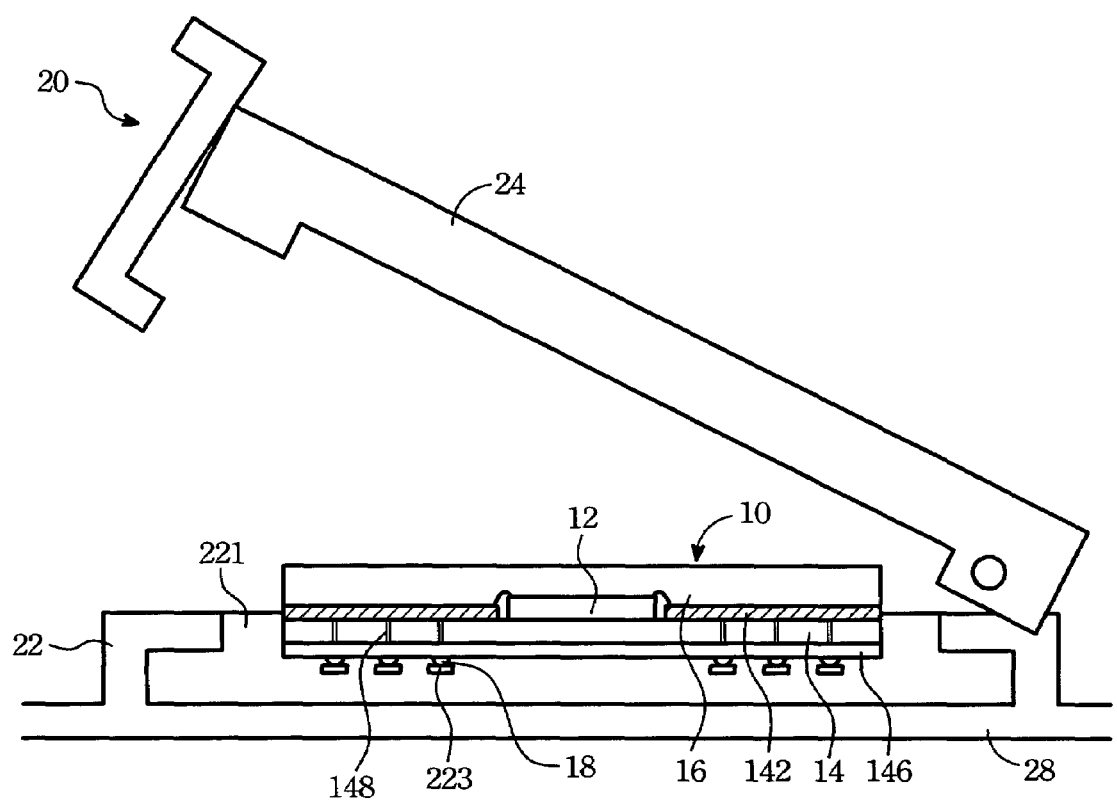
FIG. 1 is a side view of a conventional chip tester receiving a chipset therein.
Figure 2:
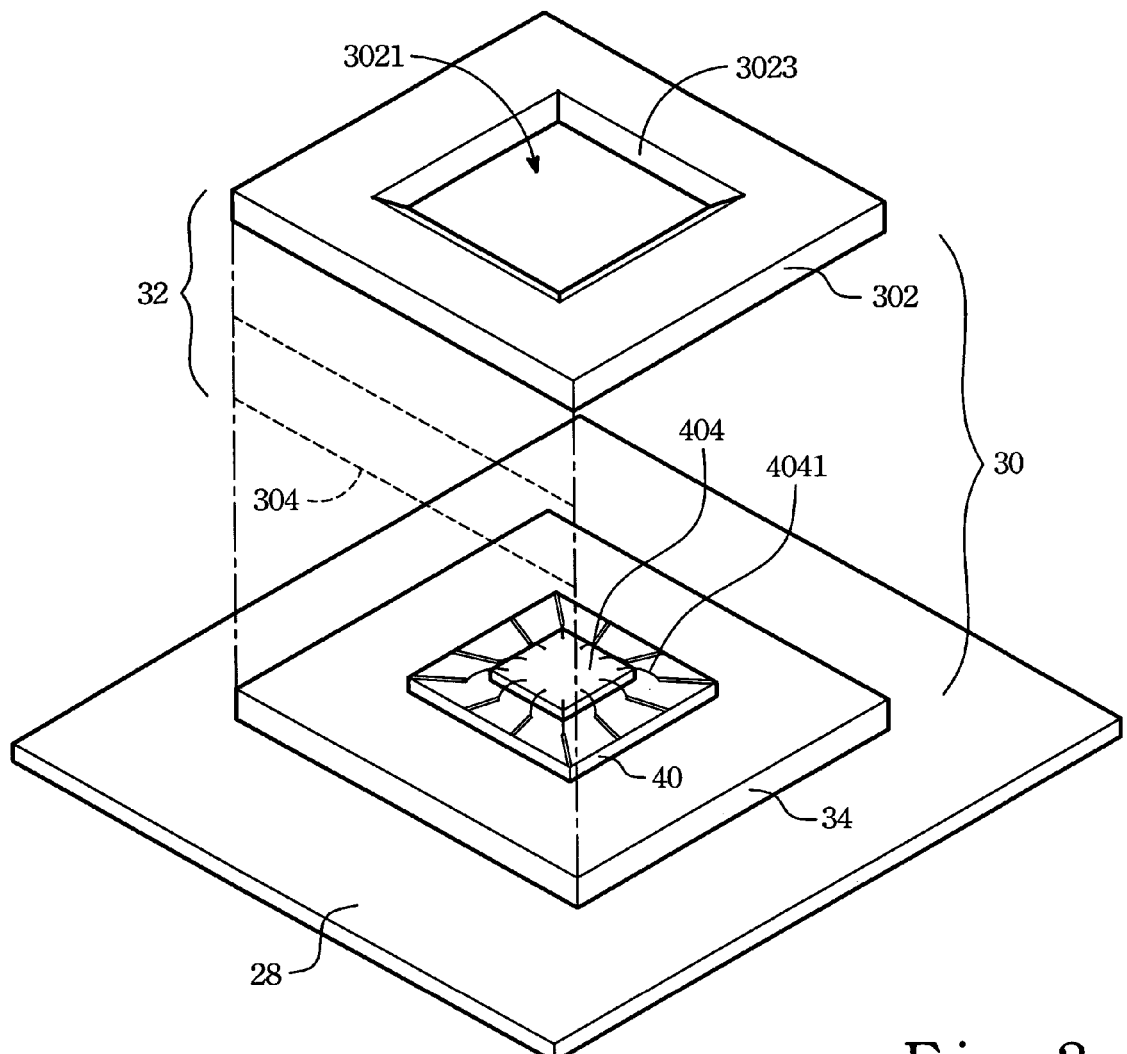
FIG. 2 is an exploded view of the preferred embodiment of a chip tester according to the present invention shown together with a chipset.
Figure 3:
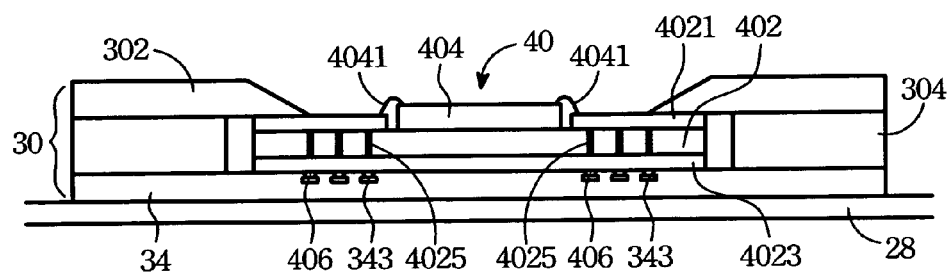
FIG. 3 is a partly sectional side view of the preferred embodiment receiving the chipset therein.

Referring to FIGS. 2 and 3, the preferred embodiment of a chip tester 30 according to the present invention is mounted on a circuit board 28 for testing validity of a chipset 40.

As illustrated, the chipset 40 generally includes a base plate 402 made from a dielectric material, a die 404 disposed on an upper surface of the base plate 402 and formed with a plurality of built-in integrated circuit paths, an upper conductive layer 4021 disposed on an upper surface of the base plate 402, a lower conductive layer 4023 disposed on a lower surface of the base plate 402, and a plurality of conductive stems 4025 extending through the base plate 402 for interconnect electrically the upper and lower conductive layers 4021, 4023. The upper conductive layer 4021 is in electrical communication with the integrated circuit paths of the die 404 via the circuit paths 4041. A plurality of electrical contacts 406 is disposed on the lower conductive layer 4023. An enclosure (not shown) encloses the assembly of the base plate 402, the die 404 and the upper and lower conductive layers 4021, 4023 in such a manner that the electrical contacts 406 protrude outwardly from the enclosure. The chipset 40 has a top end face with a predetermined area.

The preferred embodiment of the present invention includes a base member 34 and a top cover unit 32. The base member 34 receives the chipset 30 thereon, and has a plurality of built-in testing contacts 343 in electrical communication with the circuit board 28. The top cover unit 32 is made from a transparent dielectric material, is disposed above the base member 34, and includes a main body 302 in the form of a plate having an opening defining a test opening 3021 for access to the chipset 40, and a coupling member 304 that couples the plate 302 and the base member 34 so as to confine the chipset 40 therebetween. Under this condition, since the testing contacts 343 of the base member 34 are in contact with the electrical contacts 406 of the chipset, testing operation can be carried out to find out validity of the chipset 40. Preferably, the test opening 3021 in the plate 302 has a dimension greater than the predetermined area of the top end face of the chipset 40. Therefore, the entire top end face of the chipset 40 is exposed from the test opening 3021 in the plate 302. The plate 302 has a lower surface pressing against the top end face of the chipset 40 to confine the chipset 40 between the plate 302 and the base member 34 (shown in FIG. 3).

In this preferred embodiment, the test opening 3021 in the plate 302 is defined by an opening-confining wall 3023. The plate 302 has a lower surface proximate to the base member 34, and an upper surface opposite to the lower surface. The opening-confining wall 3023 in the plate 302 converges gradually from the upper surface toward the lower surface of the plate 302. In case of an uncapped chipset, the detecting needles thereof can access the exposed integrated circuit paths of the die 404 and the upper and lower conductive layers 4021, 4023 via the test opening 3021 in the top plate 302 so as to facilitate in detection of the damaged circuit path.

Figure 4:
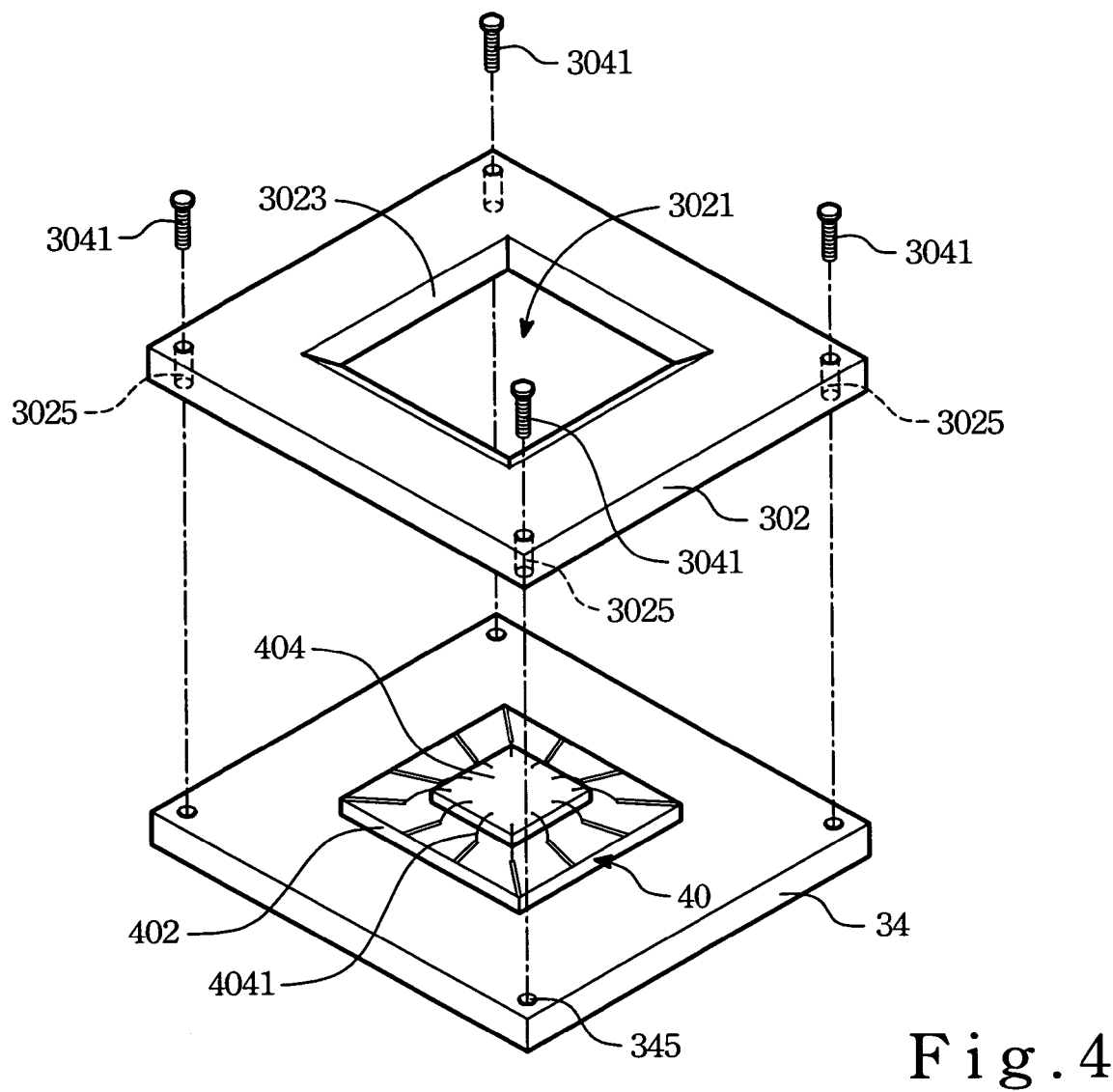
FIG. 4 illustrates how a top cover unit is fastened to a base member in a modified preferred embodiment of the present invention receiving the chipset therebetween.

Referring to FIG. 4, a modified embodiment of the present invention is shown to have the construction similar to the previous embodiment. The only difference resides in that the coupling member 304 includes four fastener screws 3041. The top plate 302 is formed with four through holes 3025 at four corners thereof. The base member 34 is formed with four threaded holes 345 at four corners thereof. The fastener screws 3041 extend through the holes 3025 in the top plate 302, and are threaded into the threaded holes 345 in the base member 34 so as to confine the chipset 40 between the top plate 302 and the base member 34.

Figure 5:
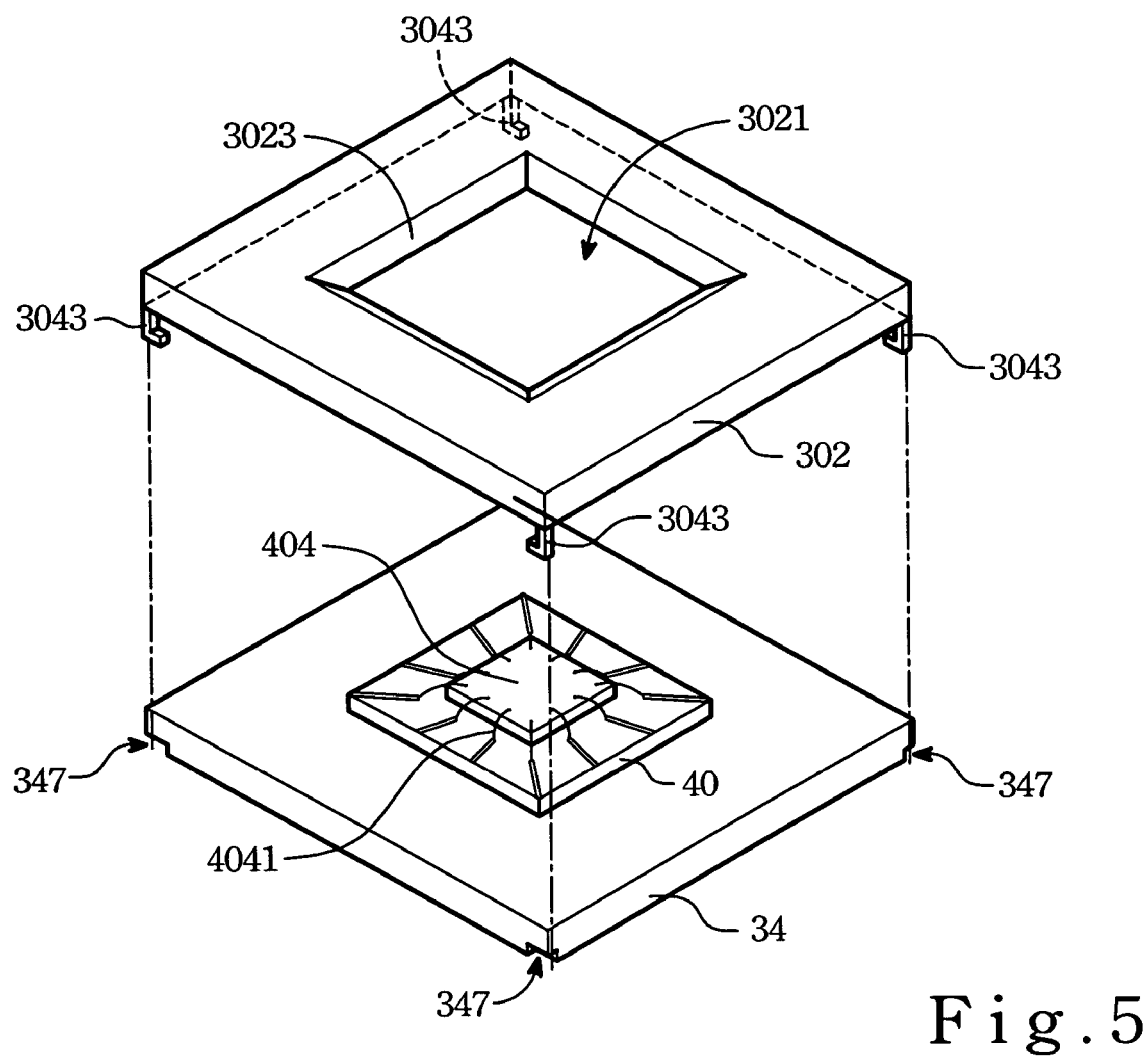
FIG. 5 is an exploded view of another modified preferred embodiment of a chip tester according to the present invention shown together with a chipset.

Referring to FIG. 5, another modified embodiment of the present invention is shown to have the constriction similar to the first embodiment. The only difference resides in that a fastening mechanism is used to fasten the top plate 302 and the base member 34. The fastening mechanism includes four male-engaging members 3043 (such as books) projecting downwardly from a lower surface of the top plate 302. The bottom side of the base member 34 is formed with four female-engaging members 347 (such as retention grooves). The male-engaging members 3043 of the top plate 302 engage the female-engaging members 347 of the base member 34 to confine the chipset between the top plate 302 and the base member 34.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A chip tester mounted on a circuit board for testing validity of a chipset, the chipset including a base plate, a die disposed on an upper surface of the base plate, a plurality of electrical contacts disposed on a lower surface of the base plate, and an enclosure enclosing the base plate and the die in such a manner that the electrical contacts protrude outwardly from the enclosure, the chip tester comprising:

a base member for receiving the chipset thereon, and having a plurality of built-in testing contacts that are in electrical communication with the circuit board and the electrical contacts of the chipset; and a top cover mounted on the base member, and having a test opening for access to the chipset.

2. The chip tester according to claim 1, wherein the chipset has a top end face defining a predetermined area, the test opening in the top cover having a dimension greater than the predetermined area of the top end face of the chipset when the chipset is disposed on the base member.

3. The chip tester according to claim 2, wherein the top cover has a lower surface pressing against the top end face of the chipset to confine the chipset between the top cover and the base member.

4. The chip tester according to claim 1, wherein the chipset has a plurality of circuit paths, the testing contacts of the base member being used for testing validity of the circuit paths of the chipset.

5. The chip tester according to claim 1, wherein the chipset has a plurality of circuit paths and wherein a testing operation is carried out through the test opening in the top cover in order to test the validity of the circuit paths in the chipset once the chipset is uncapped and is disposed on the base member.

6. The chip tester according to claim 1, wherein the top cover is made from a dielectric material.

7. The chip tester according to claim 1, further comprising at least two fastener screws, each of the top cover and the base member being formed with two screw holes, the fastener screws extending through the screw holes in the top cover and the base member for fastening the top cover and the base member.

8. The chip tester according to claim 1, further comprising a fastening mechanism including at least two male-engaging members formed on the top cover and at least two female-engaging members formed on the base member and fastening the male-engaging members to the female-engaging members, so to prevent disengagement between the base member and the top cover.

9. The chip tester according to claim 1, wherein the test opening in the top cover is defined by an opening-confining wall.

10. The chip tester according to claim 9, wherein the top cover has a lower surface proximate to the base member and an upper surface opposite to the lower surface, the opening-confining wall of the test opening converging gradually from the upper surface toward the lower surface of the top cover.

11. The chip tester according to claim 1, wherein the test opening in the top cover is located above the die once the chipset is uncapped and is disposed on the base member.

12. The chip tester according to claim 1, wherein the chipset has a plurality of upper circuit paths exposed from the test opening in the top cover by virtue of location of the top cover above the chipset once the chipset is uncapped, the upper circuit paths being used for establishing electrical communication between the die and the testing contacts of the base member.

13. A top cover unit for use in a chip tester which, in turn, is mounted on a circuit board for testing validity of a chipset and which includes a base member for receiving the chipset thereon, the chipset including a base plate, a die disposed on an upper surface of the base plate, a plurality of electrical contacts disposed on a lower surface of the base plate, and an enclosure enclosing the base plate and the die in such a manner that the electrical contacts protrude outwardly from the enclosure, the top cover unit being disposed on the base member in order to permit extension of a testing needle for directly testing validity of the chipset, the top cover unit comprising:

a main body having a test opening for exposing the die of the chipset to an exterior thereof once the chipset is uncapped; and a coupling member coupling the main body to the base member so as to confine the chipset between the main body and the base member.

14. The top cover unit according to claim 13, wherein the main body is in the form of a plate having a through hole defining the test opening, the plate being made from a dielectric material.

15. The top cover unit according to claim 13, wherein the main body is in the form of a plate having a through hole defining the test opening, the plate being made from a transparent dielectric material.

16. The top cover unit according to claim 13, wherein the main body is in the form of a plate having a through hole defining the test opening, the plate being formed with at least two holes, the coupling member being two fastener screws engaging the holes in the plate and the base member to prevent disengagement therebetween.

17. The top cover unit according to claim 13, wherein the main body is in the form of a plate having a through hole defining the test opening, the top cover unit further comprising a fastening mechanism including at least two male-engaging members formed on the plate and at least two female-engaging members formed on the base member and fastening the male-engaging members to prevent disengagement therebetween.

18. The top cover unit according to claim 13, wherein the main body is in the form of a plate having a through hole defining the test opening, the test opening in the plate being defined by an opening-confining wall, the plate having a lower surface proximate to the base member and an upper surface opposite to the lower surface, the opening-confining wall of the test opening converging gradually from the upper surface toward the lower surface of the plate.

19. The chip tester according to claim 13, wherein the main body is in the form of a plate having a through hole defining the test opening, the test opening in the plate is located above the die once the chipset is uncapped and is disposed on the base member.

20. The chip tester according to claim 13, wherein the main body is in the form of a plate having a through hole defining the test opening, the chipset having a plurality of upper circuit paths exposed from the test opening in the plate by virtue of location of the plate above the chipset once the chipset in uncapped, the upper circuit paths being used for establishing electrical communication between the die and the testing contacts of the base member.

* * * * *